United States Patent [19]

Moore

[11] Patent Number: 5,071,682

[45] Date of Patent: Dec. 10, 1991

[54] METHOD OF USING NON-RESINOUS MELAMINE TO SAFEN UREA-FORMALDEHYDE-WOOD COMPOSITE PRODUCTS AND PRODUCT PRODUCED THEREBY

[75] Inventor: William P. Moore, Hopewell, Va.

[73] Assignee: Melamine Chemicals, Inc., Donaldsonville, La.

[21] Appl. No.: 386,261

[22] Filed: Jul. 28, 1989

[51] Int. Cl.$^5$ .............................................. B05D 3/02
[52] U.S. Cl. ................................. 427/393; 156/331.3; 428/528; 528/256
[58] Field of Search ....................... 427/393; 428/528; 528/256; 156/331.3

[56] References Cited

U.S. PATENT DOCUMENTS 4,536,245  8/1985  Shiau et al. ...................... 528/256 X
4,814,422  3/1989  Diem et al. ...................... 528/256 X

*Primary Examiner*—Michael Lusignan
*Attorney, Agent, or Firm*—Breiner & Breiner

[57] ABSTRACT

The present invention is directed to a method of using non-resinous melamine to safen urea formaldehyde-wood composites and the product produced thereby. The method involves incorporation of non-resinous melamine into a urea formaldehyde-wood composite in a manner which leaves most of the melamine free to serve as a flame retardant and formaldehyde scavenger. The non-resinous melamine is incorporated into the urea formaldehyde-wood composite prior to curing the urea formaldehyde resin.

10 Claims, No Drawings

METHOD OF USING NON-RESINOUS MELAMINE TO SAFEN UREA-FORMALDEHYDE-WOOD COMPOSITE PRODUCTS AND PRODUCT PRODUCED THEREBY

FIELD OF THE INVENTION

The present invention is directed to the use of non-resinous melamine to safen urea formaldehyde-wood composite products by reducing the hazards of formaldehyde vapor emission from the finished product and: by acting as a flame retarding agent for the product.

BACKGROUND OF THE INVENTION

Various methods have been proposed in the art and some progress has been made in safening urea formaldehyde(UF)-wood composite products by reducing the flammability of and the emission of formaldehyde vapors and odors from the composite products. However, the fire retardants used in previous methods undesirably reduce the strength of the finished product and increase the hazard of toxicity to humans. Further, the formaldehyde scavengers used in prior methods undesirably reduce the chemical stability of the resins used in the composite products and allow for slow hydrolysis and chronic formaldehyde odors during the long term service of the finished products. None of the known prior methods serve to safen UF-wood composite products by reducing both the flammability and formaldehyde vapor emission while substantially retaining the physical strength of the composites.

Where toxicology and miscibility with hydrophilic wood resins are not concerns, halogenated organic compounds, such as polybrominated bisphenol or polychlorinated phosphates can be used as strong fire retardant agents in the preparation of wood composite products. However, many composite UF-wood products, such as particle board, fiber board and plywood are used around people where appreciable toxic hazards are not acceptable and therefore the use of toxic fire retardant materials is precluded. Moreover, fiber board, particle board, plywood and other wood-based composite products comprise UF resins and hydrophilic materials which are often not miscible with many polyhalogenated organic fire retardants. Low cost hydrophilic, inorganic, fire retardants, such as ammonium sulfate and ammonium phosphate, which are economically effective and reasonably safe in the environment as evident by their use as fire retardants in fighting wild brush and forest fires, are commonly used as a result. These materials, however, do not combine with UF polymers, but rather convert to soluble nitrates and therefore when used alone, are of little long term value as fire retarding agents in UF-wood composite products.

Boron compounds, in particular boric acid and sodium orate (borax), are widely used as fire retarding agents in cellulosic insulation and particle board. Sodium borate is not as effective as boric acid and its use results in a substantial reduction in the physical strength of the fiber boards and particle boards containing fire retarding amounts of sodium borate. Boric acid, on the other hand, acts as an acid catalyst and prematurely sets the UF resin which is used to cement the wood pieces in the UF-wood composites. Additionally, the catalytic action of boric acid continues in the finished composite product and eventually serves to degrade the UF resin bond strength and weaken the composite after unacceptably short service lives.

The emission of formaldehyde vapors and odors from wood composite products, such as particle board and plywood containing UF resins, have been a matter of concern to toxicologists and have been subject to regulation by government agencies, such as Housing And Urban Development (HUD), which are concerned with toxic emission in industrial and residential environments. The requirement of reduced formaldehyde concentrations and vaporizations from UF-wood composite products has been met by various processes which add unreacted urea to the UF resin used to bind the composite materials and, in some cases, to the wood particles themselves. In the book entitled *Urea-Formaldehyde Resins* by Meyer (Addison-Wesley Publishing Company, 1979), it is stated at page 233 that "Today, resins contain far less free formaldehyde. Thus, initial odor is greatly reduced. Ironically, the reduction of initial urea/formaldehyde ratio (required) to reduce initial (formaldehyde) odor produces chemically less stable resins, more susceptible to slow hydrolysis and chronic odor."

Specific processes known in the art which involve the inclusion of melamine in a wood product, utilize melamine as a component of the cured resin at the time of incorporation with the wood of the product rather than in a substantially free form at the time it is combined with the UF resin and wood. For example, U.S. Pat. No. 4,510,278 discloses a method of preparing particle board using a urea-formaldehyde resin bonding agent. The bonding agent additionally contains melamine, either in a pure or condensate form. In the method disclosed for preparing the bonding agent, the melamine is added during the condensation of the urea and formaldehyde and, accordingly, is incorporated as a component of the resin and not maintained in substantially free form. The melamine, therefore, loses its individual properties and demonstrates the properties of the newly formed combined resin.

U.S. Pat. No. 4,536,245 discloses a curable melamine-urea-formaldehyde base resin usable as a binder, particularly in particle board. The base resin, however, is a condensate, i.e. the urea, formaldehyde and melamine are polymerized together to form the resin prior to their use as a binder.

U.S. Pat. No. 4,176,115 discloses a fire resistant construction material formed by curing a powdered blend of dry melamine-formaldehyde resin and an incombustible component. The melamine is used as a component of the resin. Melamine is not disclosed as being a suitable incombustible component. The incombustible component forms the major structural properties of the article formed and is generally a mineral, such as asbestos.

U.S. Pat. No. 4,117,200 discloses fire retardant wood products made from wood particle board, a glue, such as a UF resin, and a melamine phosphate-phosphoric acid which is present as a flame retardant. The '200 patent states that if the flame retardant is added before the glue or simultaneously with the glue that the retardant clumps and coats in a non-uniform manner.

U.S. Patent Nos. 3,939,107; 4,152,320; and 4,339,357 disclose fire retardant particle boards formed utilizing a resinous binding agent wherein melamine is a component of the resin. Non-resinous melamine is not present at any time.

The art does not disclose the addition of a substantially unreacted non-resinous melamine to a UF-wood composite to provide a finished composite product having reduced flammability and reduced formaldehyde vapor emission.

OBJECTS OF THE INVENTION

A primary object of the present invention is to provide a method for non-resinous melamine treatment of UF-wood composite products which safens the finished products for consumer use by reducing the products' flammability and long term emission of formaldehyde vapors.

A further primary object of the present invention is to provide a method for treating UF-wood composite products with non-resinous melamine to produce a finished product having fire retarding properties, high mechanical strength and long term stability.

A further primary object of the present invention is to provide a non-resinous melamine and UF-wood composition which emits substantially reduced amounts of formaldehyde vapor during long term storage and service periods.

BRIEF DESCRIPTION OF THE INVENTION

The present invention is directed to a method of treating a UF-wood composite with non-resinous melamine to produce a UF-wood composite product having decreased flammability and formaldehyde vapor emissions without significant reduction in the composite product's strength.

The method involves dispersing non-resinous melamine throughout a UF-wood composite prior to curing the UF resin so that the non-resinous melamine is present in a substantially unreacted form within the composite. The composite containing the non-resinous melamine is then subjected to conditions sufficient to cure the UF resin in the composite. Only a minor part of the incorporated melamine reacts with the UF resin to form a bond with the UF resin which leaves most of the melamine free to serve as a flame retardant and formaldehyde scavenger. The curing of the UF resin serves to occlude the dispersed non-resinous melamine in the solidified UF-wood composite product.

The non-resinous melamine is preferably present in an amount from about 0.1 wt. % to 20 wt. % based on the weight of the total UF-wood composite and is comminuted so that most of the melamine passes through a 20 mesh U.S. Standard Screen. The UF resin is present in an amount sufficient to adequately cover and bond with the wood and the dispersed melamine of the composite while allowing it to be readily curable by heat or acid catalyst. The UF resin solids is preferably present in an amount from about 5 wt. % to 25 wt. % based on the total weight of the composite with the viscosity of the resin used preferably being from about 50 to 2,000 centipoise at 25° C.

The method of the present invention produces a UF-wood composite product containing a substantially unreacted non-resinous melamine dispersed throughout the solidified product. The composite product is useful in the building industry for varying applications, such as interior walls and subfloor constructions in commercial buildings, residential houses, mobile homes and elevator walls, due to the product properties of reduced flammability and formaldehyde vapor emission, high mechanical strength and long term stability.

DESCRIPTION OF PRESENTLY PREFERRED EMBODIMENTS

The UF-wood composite product produced by the method of the present invention is a safened UF-wood composite which emits substantially less formaldehyde vapor than presently allowed by HUD regulations and qualifies as Class A fire retarding board.

The degree of flammability and formaldehyde vapor emission reduction present in a UF-wood composite of the present invention can be controlled through variations in the method used to produce the UF-wood composite product. More specifically, variations in the physical structure of the melamine used, the amount of melamine used, the amount and physical properties of UF resin used, and the timing and conditions of the incorporation of melamine to the UF-wood composite mixture, all can be used to affect the degree of flammability and formaldehyde vapor reduction present in the final product.

Urea-formaldehyde resins suitable for use in the present invention are resins formed by the chemical reaction of urea and formaldehyde, usually under acid conditions. The resins are, generally, substantially methylene urea polymers, sometimes containing other chemically reacted aldehydes such as glyoxal and acetaldehyde and other amino compounds such as biuret and melamine.

Wood products suitable for use in forming the composite product of the present invention include wood chips, particles, fibers, wafers, and boards, and chemically modified wood in the form of cellulose and lignin. Particle board refers to comminuted wood agglomerated into hard boards by cured resins, usually UF resins, and includes variations such as fiber boards, chip boards, flake boards and bagasse boards.

Wood composite products are products wherein UF resins have been used to cement or glue a plurality of pieces of one or more wood products into a single new larger entity.

Non-resinous melamine, as the term is used herein, is melamine which has not been polymerized and still has reaction sites available for chemical reaction, in particular for reaction with formaldehyde. Non-resinous melamine includes molecular melamine. Molecular melamine, as the term is used herein, is melamine which exists in a substantially chemically unchanged, unreacted and unpolymerized form in the physical form of crystals, powders, agglomerates, or solutions. For example, monomethylol melamine is no longer molecular melamine, but it is still a non-resinous melamine because it has the ability to chemically react with formaldehyde. Non-resinous melamine includes "molecular melamine".

A formaldehyde scavenger, which is one of the functions of the non-resinous melamine as used in the present invention, is a substance added to a system mixture or product which consumes or inactivates traces of free formaldehyde before it has an opportunity to emit vapors or odors.

Unless otherwise noted, all percentages used herein are by weight.

The non-resinous melamine incorporated into a UF-wood composite mixture can be in a liquid, liquid slurry or dry solid form. Preferably, the non-resinous melamine is molecular melamine and, most preferably, the melamine is a dry solid molecular melamine powder. When the non-resinous melamine is present as a liquid it will be in the form of a liquid, partially reacted, melamine such as an aqueous solution or slurry of monomethylol melamine which still has substantial capacity for reacting with additional formaldehyde. While the partially reacted melamines are useful in the instant method and can be chosen due to their ease in commercial handling, they do have a lower capacity as a fire retardant and formaldehyde scavenger than the preferred molecular melamine. Unreacted dry solid molecular melamine has the highest fire retarding and formaldehyde scavenging capacity of any form of melamine, including the fire retarding melamine resins of the prior art.

For a relatively small amount of melamine to be effective in safening a UF-wood composite, the melamine should be comminuted so that most of the melamine passes through a 20 mesh U.S. Standard Screen. Large melamine particles react in a similar manner. However, large amounts of non-resinous melamine are required when large melamine particles are used resulting in a reduction of the physical strength of the UF wood composite products, thus, reducing the economic efficiency of the method.

A preferred physical form of non-resinous melamine is a comminuted molecular melamine powder wherein about 90% of the powder passes through a 200 mesh U.S. Standard Screen. These physical properties of the preferred melamine allow the amount of non-resinous melamine required to achieve safening of the UF-wood composite product to be reduced while the strength of the composite product is not reduced. The most preferred physical form of melamine is as a dry powder molecular melamine wherein 99% of the melamine powder passes through a 200 mesh U.S. Standard Screen. The bond between these latter melamine particles is very strong when the melamine is occluded in the cured UF-wood composite product.

A wide range of non-resinous melamine concentrations can be used to safen the UF-wood composites. The non-resinous melamine can be used in a range of from about 0.1 to 20.0 percent by weight of the total UF-wood composite. The amount required varies depending on the amount of UF resin used in the composite, the quality and formaldehyde to urea (F/U) mol ratio of the resin, and the level of fire retardancy desired in the composite. The preferred range of the amount of melamine incorporated into the composites is from about 1.0 to 20 percent by weight of the total UF-wood composite. Most preferably, the melamine is present in an amount from about 2.0 wt. % to 12.0 wt. % of the composite.

In many UF-wood composite products using modern UF resins containing F/U ratios of between 1.0 and 1.2, the addition of 0.1% molecular melamine substantially eliminates formaldehyde vapor emission for long use periods allowing the composite to pass required HUD formaldehyde emission tests. The addition of the non-resinous melamine reduces the formaldehyde emission by adduct formation as with urea addition. However, the reduction is more drastic and permanent with melamine addition during the composite products' extended service life than with urea addition.

Generally, more non-resinous melamine is required to be used to substantially eliminate flammability in the UF-wood composites than is required to eliminate formaldehyde vapor emission. One percent molecular melamine virtually eliminates formaldehyde vapor emission and 20% virtually eliminates flammability under fire conditions encountered in residential buildings. To substantially eliminate flammability in the UF-wood composite products, non-resinous melamine is preferably present in an amount of from about 10% to 20% by weight of the total composite.

The UF resin contributes to the fire retardance of the UF-wood composites and to the generation of formaldehyde vapors from the composites. Generally, fire retardancy and formaldehyde vapor emission are increased when increased amounts of the UF resin are present in the composites and when increased formaldehyde to urea ratios are present in the resin utilized. The method of the present invention for safening the UF-wood composites is workable even where minimal UF resin is utilized, i.e. the resin is only present in an amount sufficient to cover and bond with the wood and to disperse the non-resinous melamine. The amounts of the UF resin required depend necessarily to some extent on the surface area, particle size, and shape of the wood component of the composite. For example, coated plywood composites require less resin than fiber board. With wood sources commonly used for UF-wood composites, the amount of UF resin utilized which is sufficient to cover and bond with the wood and disperse the non-resinous melamine, is from about 5% to 25% UF resin solids (based on the total weight of the composites), with the resin having a viscosity from about 50 to 2,000 centipoise at 25 °C.

Preferred performance is obtained when the UF resin solids is present in an amount from about 7% to 14% by weight of the total composite with the resin viscosity being from about 250 to 1,000 centipoise. These resin conditions produce strong UF-wood composites having low flammability and low formaldehyde vapor emissions. The most preferred range of UF resin is from about 8 wt. % to 12 wt. % with the viscosity being from about 400 to 700 centipoise and containing from about 60% to 70% solids by weight.

The timing and the conditions for incorporating the non-resinous melamine into the UF-wood composite can also affect the degree of safening produced in the composite product of the present invention. The non-resinous melamine is incorporated into the UF-wood composite while the UF resin is uncured and still capable of flowing onto and reacting with melamine. If the UF resin is cured or if a resinous melamine is dispersed, no appreciable reaction potential is left between the melamine and the resin and the method of the present invention would not be obtained. To complete the method of the present invention, the UF resin is cured following the incorporation of the non-resinous melamine thereby occluding the dispersed non-resinous melamine in the composite. The dispersed non-resinous melamine is reacted by the UF resin to form a strong bond between the melamine and the remainder of the UF-wood composite. Only a minor part of the melamine reacts with the UF resin to form the bond, however, leaving most of the melamine free to serve as a flame retardant and formaldehyde scavenger.

The method is preferably carried out by widely dispersing molecular melamine throughout the UF-wood composite while the UF resin is uncured and liquid. The method is then completed by heating the composite to cure the UF resin. The composite is cured under pressures of from about 40 to 250 pounds per square inch (psi) at a temperature from about 90° C. to 130° C. in the presence of from about 0% to 4% by weight of the UF resin of an acid catalyst. Suitable acid catalysts include formic acid, sulfuric acid, ammonium chloride, magnesium chloride or the like. Most preferably, the UF resin is cured at a temperature of from about 100° C. to 120° C. with from about 1.0 to 3.0 wt. % ammonium chloride for a period of from about 1 to 5 minutes under a pressure of from about 75 to 150 psi. As described above, one percent molecular melamine virtually eliminates formaldehyde vapor emission and 20% virtually eliminates flammability under fire conditions encountered in residential buildings. From about 2 wt. % to 12 wt. % of molecular melamine is the most preferred melamine concentration for safening UF-wood composites for use in the building industry to economically eliminate the hazard of formaldehyde vapor emission and to provide a UF-wood composite exhibiting a Class A fire resistance rating. Pressure curing can be used to hold the composite in place while the cure is quickly completed and any moisture is substantially removed. The method of safening UF-wood composites can also be carried out where the curing is achieved slowly at atmospheric pressure. However, this latter procedure is not usually economical and the product's physical strength may be less than desired.

The manner in which the melamine is incorporated can be varied so long as the melamine is effectively dispersed throughout the composite before the UF resin of the composite is cured. Generally, the non-resinous melamine is added as a dispersion in the UF resin when the melamine utilized is less than about 50% by weight of the resin. When higher amounts of melamine are required in highly fire retardant composites, it is advantageous to physically disperse or combine the melamine with the wood portion of the composite before the UF resin is mixed with the wood. Alternatively, a UF resin non-resinous melamine dispersion can be combined with wood products blended with comminuted non-resinous melamine to form the fire retardant UF-wood composite.

When the method of the present invention is used to produce a UF-wood composite product, non-resinous melamine is the only formaldehyde scavenger necessary. The non-resinous melamine is particularly effective because it reacts with the formaldehyde slowly as it becomes available during the curing of the UF resin and, more importantly, the non-resinous melamine reacts with the formaldehyde emitted during the slow decomposition of the cured resin throughout its long use life. The formaldehyde melamine adduct formed in the scavenging reaction is stable with almost no tendency to degrade over long periods of time. Other formaldehyde scavengers known in the art have been found to have negligible fire retarding effect on UF-wood composite products.

The non-resinous melamine containing UF-wood composite product of the present invention also allows the non-resinous melamine to be the sole fire retardant component in the composite. However, the non-resinous melamine can be used in combination with other fire retardants so long as they do not substantially react with the melamine to reduce its formaldehyde scavenging ability, or reduce its fire retarding effect, or change the characteristic of the UF resin.

The non-resinous melamine, particularly molecular melamine, functions as a fire retardant by evaporative-sublimative cooling at moderate temperatures; by intumescence which amounts to a foaming occurring on the surface of the melamine at high temperatures to insulate the composite from an external heat source (fire) and to prevent ready access of oxygen to cause propagation of burning; and by endothermic degradation providing further cooling at relatively high temperatures.

Other fire retardants which can be combined with the non-resinous melamine in the present invention includes smoke retarding agents such as phosphates, including magnesium, ammonium, and calcium ortho- or polyphosphates; and effective low temperature evaporative coolants, such as alumina trihydrate which releases water of hydration.

The following examples illustrate the method of the present invention for safening UF-wood composites utilizing non-resinous melamine.

EXAMPLE 1

Example 1 illustrates the effectiveness of the method of incorporating low concentrations of molecular melamine into UF-wood composite products to substantially reduce formaldehyde vapor emission.

A UF resin was prepared containing 65% solids, with a 1 formaldehyde to urea mol ratio, a kinematic viscosity of 420 centipoise at 25° C., and a gel time of 65 seconds at 100° C. using 2% catalyst of 10% ammonium chloride.

A supply of comminuted dry wood chips were screened into two sizes. The first size passed through ⅛ inch screen openings and the second size passed through ⅜ inch screen openings. The first size was selected to make up the outer surface of the UF-wood composite particle board and the second size to make up the core of the particle board. The core amounted to about 50% of the wood and the two equal outer surfaces amounted to about 50% of the wood.

A catalyst solution containing 10% ammonium chloride in water was prepared. Catalyst solution amounting to 5%, on a solids basis, of the UF-resin was mixed with the resin before the resin's use.

Molecular melamine powder, 90% of which passed through a 200 mesh U.S. Standard Screen was dispersed into the resin-catalyst mixture. The liquid mixture was then rapidly blended with the wood chips. The resin solids used amounted to 9% of the UF-wood composite and the melamine used amounted to 3% of the resin solids and 0.27% of the UF-wood composite. The resin-wood chip mixes for the surfaces and the core of a particle board were laid on a plastic mat and given a light press to provide enough physical integrity for handling in the form of a board. The formed board was then placed between two heated steel platens in a press heated to a temperature of 125° C. A pressure of 75 psi was applied to the platens and held for 4.3 minutes allowing the core of the board to reach a temperature of 102° C. The board was then discharged from the press, cooled below 50° C., and the surfaces and edges ground smooth to produce an 8 ft.×16 ft.×13/16 in. board which was then cut to produce four 4 ft.×8 ft.×13/16 in. boards.

In this test series, 1.60 boards were prepared using the above procedure. Another series of 160 boards were prepared using the same procedure except that urea amounting to 8% of the resin as a 50% aqueous solution was used instead of the melamine. This second procedure is essentially the present state of the art in preparing particle boards having low formaldehyde vapor emission.

Tensile strength evaluations were made by measuring the force required to pull apart 2 in.×2 in. samples cut from the larger boards. The melamine treated boards required 117 psi force for failure compared to 115 psi for the ureatreated board, showing that the melamine slightly increased the physical strength of the board.

A 2 in.×2 in. sample of the boards was placed in a desiccator containing water in the bottom to absorb any formaldehyde vapor emitted in a two hour test period at 72° F. The fresh board sample where melamine was added emitted formaldehyde amounting to 0.7 parts per million (ppm) compared to 0.6 ppm where urea was added and 8.0 ppm where no scavenger was added.

Long term humid room formaldehyde vapor emission tests were run in a room size controlled environment chamber in the manner prescribed by HUD regulations on the board samples as above prepared. Formaldehyde emissions from boards prepared without scavengers were too high for testing in this sensitive apparatus. After seven days, formaldehyde concentration in the humidity chamber, containing a 4 ft.×8 ft. ×13/16 in. board with the molecular melamine treatment, was 0.16 ppm, 0.11 ppm after 38 days, 0.09 ppm after 58 days, and 0.05 ppm after 75 days. For the urea-treated boards, the corresponding formaldehyde concentrations were 0.31, 0.18, 0.14, and 0.13 ppm. The background formaldehyde concentration in the air was from 0.06 to 0.08. Accordingly, the air in the humidity chamber tests containing the UF-wood composite particle board treated with less than 0.3 wt. % of molecular melamine was no different from outside air in 60 to 75 days. The board containing more than twice that amount of urea was still emitting formaldehyde.

EXAMPLE 2

Example 2 illustrates that non-resinous melamine may be used effectively as a formaldehyde scavenger in the instant invention while melamine in the form of a resin is ineffective.

A bench scale test was carried out to produce 6 in.×6 in.×½ in. particle boards using the techniques and general procedure of Example 1 except that instead of adding molecular melamine in the catalyst-UF resin mixture, monomethylol melamine, a non-resinous melamine compound retaining a capacity to react with substantially more formaldehyde, was blended with the wood chips prior to blending the resin-catalyst mixture with the wood chips. The amount of monomethylol melamine added to the mixture resulted in a free melamine content in the finished particle board of 0.8%.

Also produced in the same bench scale apparatus and procedure was a UF-wood composite particle board containing 2.0% urea, in place of melamine, as a formaldehyde scavenger.

After 60 days in the HUD humidity chamber test, formaldehyde concentration in the air was 0.07 ppm with the monomethylol melamine formaldehyde scavenger as compared to 0.15 ppm with the urea scavenger treated board.

EXAMPLE 3

Example 3 illustrates the fire retarding ability of molecular melamine when used according to the present invention to produce UF-wood composite particle boards.

The bench scale procedures and techniques of Example 2 were generally used to produce 6 in.×6 in.×½ in. particle boards. The UF resin used amounted to 12% as solids of the composite and had an F/U mol ratio of 1.5:1, instead of the 1:1 ratio used in Example 2, contained 65% solids and had a kinematic viscosity of 410 centipoise at 25° C. The melamine used was the 200 mesh powder of Example 1. Melamine powder amounting to 12% of the composite was added to the wood chips before the resin and catalyst was thoroughly blended with the chips. The amount of catalyst (10% ammonium chloride) was increased to 8% of the UF resin.

The boards were pressed at a core temperature of 170° C. for six minutes at 90 psi, cooled and evaluated. The desiccator test showed no formaldehyde vapor emitted from the UF-wood composite particle board.

Flame tests similar to California Bulletin 117 Test MVSS 302 were carried out on samples of the boards which showed the flames to be extinguished after three seconds. When a UF-wood composite particle board was prepared by the same procedure, but without the melamine addition the flames were not extinguished after 20 seconds.

EXAMPLE 4

Example 4 illustrates the fire retarding and formaldehyde scavenging ability of molecular melamine when it is used in combination with other fire retarding agents.

The bench scale procedure and techniques of Example 2 were generally used to produce 6 in.×6 in.×½ in. particle boards, with the compositions and the weights of resin and catalysts as used in Example 3. The molecular melamine based fire retardant composition amounting to 13% of the UF-wood composite was blended with the wood chips prior to addition of the resin-catalyst mixture. The fire retardant composition comprised 46.7 parts molecular melamine; 28.3 parts monoammonium phosphate; and 25.0 parts alumina trihydrate.

The boards were pressed at a core temperature of 108° C. for five minutes at 90 psi, cooled and evaluated. The desiccator test showed no formaldehyde vapor emission for the UF-wood composite particle board. The flame test showed that the flames were extinguished in less than three seconds.

Physical strength tests made by the procedure of Example 1 showed a tensile strength of 110 psi, almost as high as boards containing no fire retardant, i.e., 115 psi.

As will be apparent to one skilled in the art, various modifications can be made within the scope of the aforesaid description. Such modifications being within the ability of one skilled in the art form a part of the present invention and are embraced by the appended claims.

It is claimed:

1. A method of incorporating non-resinous melamine into a urea formaldehyde resin-wood product composite to produce a urea formaldehyde-wood composite product having reduced flammability and reduced formaldehyde vapor emission comprising: (1) dispersing non-resinous melamine with an uncured urea formaldehyde resin and a wood product to form a composite and (2) subjecting said composite formed in step (1) to conditions sufficient to cure said urea formaldehyde resin.

2. A method according to claim 1 wherein said dispersion of step (1) is carried out by first dispersing said non-resinous melamine with said uncured urea formaldehyde resin and then blending said formed dispersion with said wood product.

3. A method according to claim 1 wherein said dispersion of step (1) is carried out by first dispersing said non-resinous melamine with said wood product and then blending said melamine and wood product dispersion with said uncured urea formaldehyde resin.

4. A method according to claim 1 wherein said dispersion of step (1) is carried out by first combining a portion of said non-resinous melamine with said uncured urea-formaldehyde resin and a portion of said non-resinous melamine with said wood product and then blending said two mixtures to form a composite.

5. A method according to claim 1 wherein said non-resinous melamine is molecular melamine.

6. A method according to claim 1 wherein said non-resinous melamine is present in an amount of from about 0.1% to 20% based on the total weight of said composite.

7. A method according to claim 1 wherein said urea formaldehyde resin is present in an amount of from about 5% to 25% urea formaldehyde resin solids based on the total weight of said composite.

8. A method according to claim 1 wherein said dispersion of step (1) further contains a catalyst.

9. A method according to claim 1 wherein said non-resinous melamine is a solid having a particle size which allows it to substantially pass through a 20 mesh U.S. Standard Screen.

10. A method according to claim 1 wherein said non-resinous melamine is a solid having a particle size which allows it to substantially pass through a 200 mesh U.S. Standard Screen.

* * * * *